(12) United States Patent
Shpilyuck et al.

(10) Patent No.: US 12,223,372 B2
(45) Date of Patent: Feb. 11, 2025

(54) ISOLATED ENVIRONMENT PROVISIONING IN SERVICE MESH-BASED MICROSERVICES SYSTEMS

(71) Applicant: Dell Products L.P., Round Rock, TX (US)

(72) Inventors: Boris Shpilyuck, Ashdod (IL); Nisan Haimov, Be'er-Sheva (IL); Igor Dubrovsky, Be'er-Sheva (IL)

(73) Assignee: DELL PRODUCTS L.P., Round Rock, TX (US)

( * ) Notice: Subject to any disclaimer, the term of this patent is extended or adjusted under 35 U.S.C. 154(b) by 24 days.

(21) Appl. No.: 18/151,903

(22) Filed: Jan. 9, 2023

(65) Prior Publication Data

US 2024/0231972 A1  Jul. 11, 2024

(51) Int. Cl.
| | |
|---|---|
| G06F 8/65 | (2018.01) |
| G06F 8/71 | (2018.01) |
| G06F 9/54 | (2006.01) |
| G06F 11/36 | (2006.01) |
| H04L 9/32 | (2006.01) |
| H04L 41/082 | (2022.01) |
| H04L 67/63 | (2022.01) |

(52) U.S. Cl.
CPC ............... *G06F 9/547* (2013.01); *G06F 8/65* (2013.01); *G06F 8/71* (2013.01); *H04L 41/082* (2013.01); *H04L 67/63* (2022.05)

(58) Field of Classification Search
CPC ............. G06F 8/65; G06F 11/36; G06F 8/71; G06F 9/445; G06F 16/955
See application file for complete search history.

(56) References Cited

U.S. PATENT DOCUMENTS

| | | |
|---|---|---|
| 11,153,412 B1 | 10/2021 | Varadan et al. |
| 11,457,080 B1 | 9/2022 | Meduri et al. |
| 11,563,636 B1 | 1/2023 | Kairali et al. |
| 11,570,271 B2 | 1/2023 | Bahl et al. |
| 11,570,279 B1 | 1/2023 | Kairali et al. |
| 2005/0278652 A1 | 12/2005 | Scholz |

(Continued)

OTHER PUBLICATIONS

Notice of Allowance mailed Dec. 22, 2023 for U.S. Appl. No. 18/156,183, 37 pages.

(Continued)

*Primary Examiner* — Nicholas R Taylor
*Assistant Examiner* — Ho T Shiu
(74) *Attorney, Agent, or Firm* — Amin, Turocy & Watson, LLP

(57) ABSTRACT

A system can receive, at an integration and deployment component, a changeset for an updated microservice and an identifier of a user account that is configured to access the updated microservice, wherein a current version of the microservice is deployed to a service mesh that comprises a group of microservices. The system can instantiate the updated microservice to the service mesh. The system can update routing rules for the service mesh to indicate that any traffic in the service mesh that is associated with the user account and that is directed to the current version of the microservice is to be routed to the updated microservice. The system can, in response to receiving traffic determined to be associated with the user account and directed to the current version of the microservice, route the traffic to the updated microservice instead of routing the traffic to the current version of the microservice.

20 Claims, 13 Drawing Sheets

(56) References Cited

U.S. PATENT DOCUMENTS

| | | | |
|---|---|---|---|
| 2011/0197163 A1 | 8/2011 | Jegal et al. | |
| 2013/0138612 A1 | 5/2013 | Iyer | |
| 2017/0140146 A1 | 5/2017 | Mehta et al. | |
| 2018/0270122 A1* | 9/2018 | Brown | H04L 67/30 |
| 2019/0179631 A1* | 6/2019 | Benedetti | G06F 9/44505 |
| 2019/0273746 A1* | 9/2019 | Coffing | G06Q 20/40 |
| 2020/0120168 A1 | 4/2020 | Nainar et al. | |
| 2020/0177549 A1 | 6/2020 | Barton et al. | |
| 2020/0336553 A1* | 10/2020 | Yeddula | G06F 16/9566 |
| 2021/0174952 A1 | 6/2021 | Leong et al. | |
| 2021/0342738 A1 | 11/2021 | Sarferaz | |
| 2021/0400464 A1 | 12/2021 | Canas | |
| 2022/0109741 A1 | 4/2022 | Chen et al. | |
| 2022/0113911 A1 | 4/2022 | Kuriata et al. | |
| 2022/0342718 A1 | 10/2022 | Iqbal et al. | |
| 2022/0386393 A1* | 12/2022 | Tamvada | H04W 48/18 |
| 2023/0130973 A1 | 4/2023 | Madan et al. | |

OTHER PUBLICATIONS

Shpilyuck, et al. "Isolated Environment Provisioning in Service Mesh-Based Microservices Systems" U.S. Appl. No. 18/154,477, filed Jan. 13, 2023, 60 pages.

Shpilyuck, et al. "Isolated Environment Provisioning in Service Mesh-Based Microservices Systems" U.S. Appl. No. 18/156,183, filed Jan. 18, 2023, 60 pages.

Corrected Notice of Allowability mailed Jan. 3, 2024 for U.S. Appl. No. 18/156,183, 39 pages.

Shpilyuck, et al. "Stretched Environment Provisioning" U.S. Appl. No. 18/643,879, filed Apr. 23, 2024, 50 pages.

Shpilyuck, et al. "Utilizing Local Workgroups in a Stretched Environment" U.S. Appl. No. 18/643,887, filed Apr. 23, 2024, 56 pages.

Office Action mailed Sep. 23, 2024 for U.S. Appl. No. 18/154,477, 80 pages.

* cited by examiner

400

(402)

RECEIVING, AT AN INTEGRATION AND DEPLOYMENT COMPONENT, A CHANGESET FOR AN UPDATED MICROSERVICE AND AN IDENTIFIER OF A USER ACCOUNT THAT IS CONFIGURED TO ACCESS THE UPDATED MICROSERVICE, WHEREIN THE UPDATED MICROSERVICE REPRESENTS AN UPDATED VERSION RELATIVE TO A CURRENT VERSION OF A MICROSERVICE, AND WHEREIN THE CURRENT VERSION OF THE MICROSERVICE IS DEPLOYED TO A SERVICE MESH THAT COMPRISES A GROUP OF MICROSERVICES 404

INSTANTIATING THE UPDATED MICROSERVICE TO THE SERVICE MESH BASED ON THE CHANGESET 406

UPDATING ROUTING RULES FOR THE SERVICE MESH TO INDICATE THAT ANY TRAFFIC IN THE SERVICE MESH THAT IS ASSOCIATED WITH THE USER ACCOUNT AND THAT IS DIRECTED TO THE CURRENT VERSION OF THE MICROSERVICE IS TO BE ROUTED TO THE UPDATED MICROSERVICE 408

IN RESPONSE TO RECEIVING TRAFFIC DETERMINED TO BE ASSOCIATED WITH THE USER ACCOUNT AND DIRECTED TO THE CURRENT VERSION OF THE MICROSERVICE, ROUTING THE TRAFFIC TO THE UPDATED MICROSERVICE INSTEAD OF ROUTING THE TRAFFIC TO THE CURRENT VERSION OF THE MICROSERVICE 410

```
        ( 1002 )
           │
           ▼
┌─────────────────────────────────────────────────────────────┐
│   SAVING THE IDENTIFIER OF THE USER ACCOUNT TO A LIBRARY 1004│
└─────────────────────────────────────────────────────────────┘
           │
           ▼
┌─────────────────────────────────────────────────────────────┐
│ THE LIBRARY ADDING THE IDENTIFIER OF THE USER ACCOUNT TO CALLS│
│ REPRESENTED IN A CALL CHAIN THAT CORRESPONDS TO THE TRAFFIC 1006│
└─────────────────────────────────────────────────────────────┘
           │
           ▼
        ( 1008 )
```

BASED ON RECEIVING AN IDENTIFIER OF A USER ACCOUNT AND A CHANGESET APPLICABLE TO GENERATE AN UPDATED MICROSERVICE RELATIVE TO A CURRENT VERSION OF A MICROSERVICE THAT IS DEPLOYED TO A SERVICE MESH, DEPLOYING THE UPDATED MICROSERVICE TO THE SERVICE MESH 1104

↓

UPDATING ROUTING RULES FOR THE SERVICE MESH TO INDICATE THAT ANY PORTIONS OF TRAFFIC IN THE SERVICE MESH THAT ARE ASSOCIATED WITH THE USER ACCOUNT AND THAT ARE DIRECTED TO THE CURRENT VERSION OF THE MICROSERVICE IS TO BE ROUTED TO THE UPDATED MICROSERVICE 1106

↓

IN RESPONSE TO RECEIVING FIRST TRAFFIC OF THE TRAFFIC, WHEREIN THE FIRST TRAFFIC IS DETERMINED TO BE ASSOCIATED WITH THE USER ACCOUNT AND DETERMINED TO BE DIRECTED TO THE CURRENT VERSION OF THE MICROSERVICE, ROUTING THE FIRST TRAFFIC TO THE UPDATED MICROSERVICE INSTEAD OF ROUTING THE FIRST TRAFFIC TO THE CURRENT VERSION OF THE MICROSERVICE 1108

ISOLATED ENVIRONMENT PROVISIONING IN SERVICE MESH-BASED MICROSERVICES SYSTEMS

BACKGROUND

Microservices can generally be a variant of a service-oriented architecture (SOA) computer architectural style that structures an application as a collection of loosely coupled services. Microservices can be deployed as part of a software as a service (SaaS) model, where a system of microservices is centrally hosted, and is accessed by a thin client (e.g., a web browser).

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can receive, at an integration and deployment component, a changeset for an updated microservice and an identifier of a user account that is configured to access the updated microservice, wherein the updated microservice represents an updated version relative to a current version of a microservice, and wherein the current version of the microservice is deployed to a service mesh that comprises a group of microservices. The system can instantiate the updated microservice to the service mesh based on the changeset. The system can update routing rules for the service mesh to indicate that any traffic in the service mesh that is associated with the user account and that is directed to the current version of the microservice is to be routed to the updated microservice. The system can, in response to receiving traffic determined to be associated with the user account and directed to the current version of the microservice, route the traffic to the updated microservice instead of routing the traffic to the current version of the microservice.

An example method can comprise receiving, by a system comprising a processor, a changeset for an updated microservice and an identifier of a user account, wherein the updated microservice is representative of an update to a current version of a microservice that is deployed to a service mesh. The method can further comprise deploying, by the system, the updated microservice to the service mesh based on the changeset. The method can further comprise updating, by the system, routing rules for the service mesh to indicate that any traffic in the service mesh that is associated with the user account and that is directed to the current version of the microservice is to be routed to the updated microservice. The method can further comprise, in response to receiving traffic that is associated with the user account and that is directed to the current version of the microservice, routing, by the system, the traffic to the updated microservice while foregoing routing the traffic to the current version of the microservice.

An example non-transitory computer-readable medium can comprise instructions that, in response to execution, cause a system comprising a processor to perform operations. These operations can comprise, based on receiving an identifier of a user account and a changeset applicable to generate an updated microservice relative to a current version of a microservice that is deployed to a service mesh, deploying the updated microservice to the service mesh. These operations can further comprise updating routing rules for the service mesh to indicate that any portions of traffic in the service mesh that are associated with the user account and that are directed to the current version of the microservice is to be routed to the updated microservice. These operations can further comprise, in response to receiving first traffic of the traffic, wherein the first traffic is determined to be associated with the user account and determined to be directed to the current version of the microservice, routing the first traffic to the updated microservice instead of routing the first traffic to the current version of the microservice.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 4 illustrates an example process flow that can facilitate isolated environment provisioning in service mesh-based microservices systems, in accordance with an embodiment of this disclosure;

FIG. 10 illustrates another example process flow that can facilitate isolated environment provisioning in service mesh-based microservices systems, in accordance with an embodiment of this disclosure;

FIG. 11 illustrates another example process flow that can facilitate isolated environment provisioning in service mesh-based microservices systems, in accordance with an embodiment of this disclosure;

DETAILED DESCRIPTION

Overview

Figure 1:
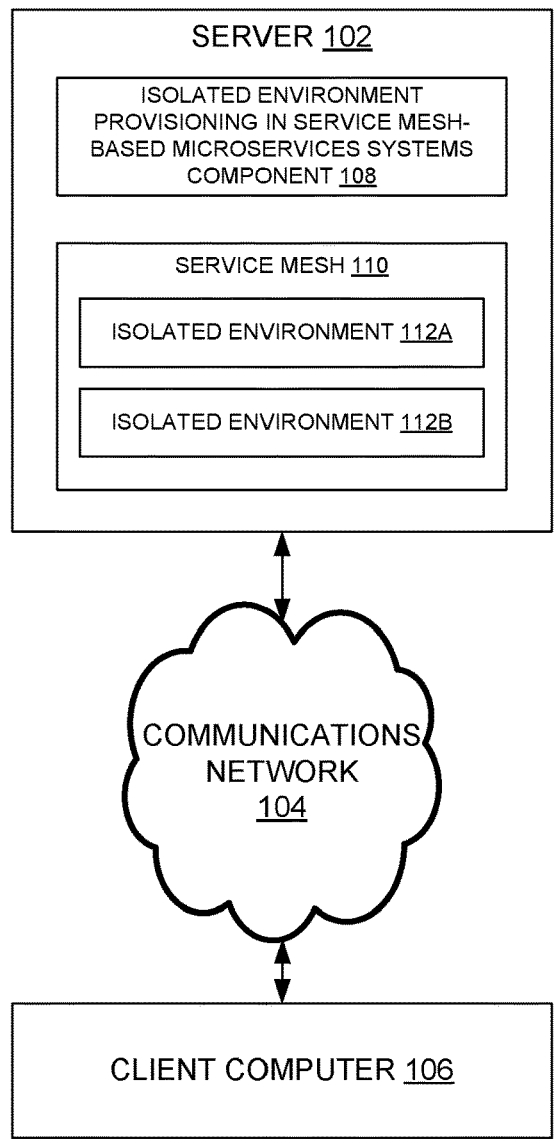
FIG. 1 illustrates an example system architecture that can facilitate isolated environment provisioning in service mesh-based microservices systems, in accordance with an embodiment of this disclosure.

The present techniques generally relate to efficiently creating an isolated environment for the user within existing service mesh.

It can be that typical microservices environments consist of hundreds or even thousands of the microservices that form a complex graph of dependencies between them. A service mesh can be used in such systems to ease the task of traffic routing, upgrades, access control, etc.

When a new feature or fix is developed, it can be desired to validate this feature or fix as a part of the whole service mesh. For example, if the feature introduces changes even to a single microservice, it can be desired that this microservice is tested as a part of the whole system to make sure that the system behavior is correct and new problems have not been introduced. This can also be relevant to critical production issues that cannot be easily reproduced in a staging environment due to specific production data—it can be desired that such fixes are thoroughly verified in production as a part of the whole service mesh, and without a risk of breaking the whole system.

Prior approaches in this area can generally be as follows. A prior approach can be to perform a simple validation of the microservice locally on a developer's computer, and then to submit the change to a staging environment where the change can be validated manually, and through automated tests.

But in case that the new change introduces a problem, another flow that depends on the changed microservice could become broken until the problem is discovered and resolved. Such an outcome can make the whole environment unusable, especially considering examples where multiple developers work on different microservices, and each one of them might introduce a problem.

Another prior approach can be to create a full copy of the current staging environment, just with the changed microservices instead of the original ones (such as in a separate namespace). Then testing can be performed in this environment, without introducing the problems to the main staging environment. In some examples, the changes will be deployed to the main staging environment only where the tests are successful. This approach can guarantee extra stability for the main staging branch, but can be very expensive—every introduced change can require a full copy of the original environment, which might consist of hundreds of the microservices.

Another prior approach can be to use feature flags to isolate the code changes, so only specific users that were defined per feature flag can reach the changes. It can be that this approach does not provide a complete solution because some changes are too wide and cannot be isolated (e.g., changing significant libraries, database drivers, etc.).

A problem addressed by the present techniques can be how to provision an isolated environment for new changes in such a way that it does not require a full copy of the original environment, and also does not introduce fragility due to multiple broken flows in the same shared environment.

A solution to this problem, according to the present techniques, can be to deploy changed microservices to a shared environment, where their instances can coexist alongside the original unchanged instances. Using a service mesh's capabilities and "deployment validator" information received from a continuous integration/continuous deployment (CI/CD) process, smart routing can be performed: a flow originated by the deployment validator can pass through the changed microservices instances, while a flow originated by other users can pass through the original microservices instances, which are not related to the changes. Microservices that are not related to the changes can be shared by both the deployment validator and other users.

Provisioning of an isolated environment within service mesh based microservice systems can allow deploying and verifying critical patches to an isolated environment directly within production, without effecting real production traffic. This ability can be critical where the problem can be tested/reproduced only in production due to a very specific circumstances/data. Provisioning of an isolated environment can also facilitate increasing development velocity by allowing much faster validation of features/fixes. The isolated environment can be created automatically, and can allow validating features without affecting other people who work in the environment, or, vice versa, being affected by their work in case of any problems in the introduced changes. The isolated environment can facilitate reducing costs associated with provisioning of a full copy of the environment for every change. Producing a full copy for every change can require lots of resources that are not always available in on-premise environments, or cost a lot of money in cloud environments.

In some examples, provisioning of an isolated environment can be a complex task due to the following reasons. There can be hundreds or thousands of microservices that have complex dependencies one on another. There can be multiple users that introduce changes within the same environment to multiple microservices. It can be infeasible to create a full copy of an original environment for every change. Taking these constraints into consideration, there can be a desire for a system that allows each user to have an "illusion" of having its own dedicated environment, even though in reality the environment is shared among dozens or hundreds of users.

In some examples, the present techniques can generally be divided into two parts: deploy time and runtime. In deploy time, there can be isolated environment provisioning, which can allow only a deployment validator's application programming interface (API) calls to pass through changed microservices, while other users' API calls pass through the original versions of the microservices. In runtime, end user information can be propagated through call chains to be able to achieve user-based routing described with respect to deploy time.

The present techniques can be implemented to achieve efficient, automatic provisioning of isolated environments within existing service mesh-based microservices systems. This can facilitate creating a more stable environment, increase development velocity, and make it easier to troubleshoot and validate critical production issues.

Example Architectures

FIG. 1 illustrates an example system architecture 100 that can facilitate isolated environment provisioning in service mesh-based microservices systems, in accordance with an embodiment of this disclosure.

System architecture 100 comprises server 102, communications network 104, and client computer 106. In turn, server 102 comprises isolated environment provisioning in service mesh-based microservices systems component 108, service mesh 110, isolated environment 112A, and isolated environment 112B.

Figure 13:
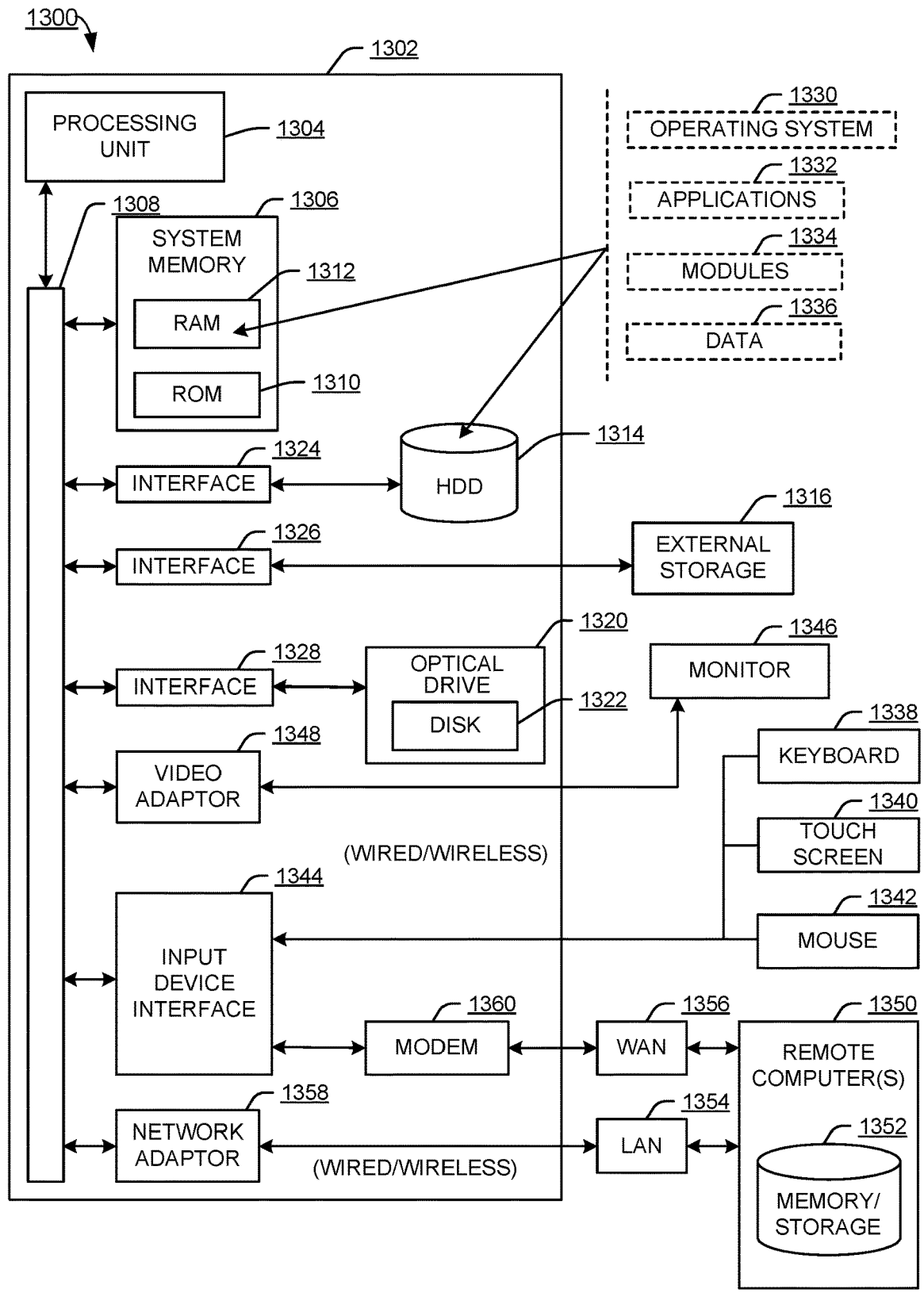
FIG. 13 illustrates an example block diagram of a computer operable to execute an embodiment of this disclosure.

Each of server 102 and/or client computer 106 can be implemented with part(s) of computing environment 1300 of FIG. 13. Communications network 104 can comprise a computer communications network, such as the Internet.

Server 102 can host a service that comprises a group of microservices, and do so within service mesh 110. Isolated environment provisioning in service mesh-based microservices systems component 108 can receive a changeset for one of those microservices from client computer 106. This changeset can be associated with a user account that submitted the changeset to server 102.

Isolated environment provisioning in service mesh-based microservices systems component 108 can maintain both a current version of a microservice and instantiate an updated version of the microservice from the changeset. Then, requests from user accounts other than the user account that submitted the changeset can be routed through the current version of the microservice (e.g., as part of isolated environment 112A), and requests from the user account that submitted the changeset can be routed through the updated version of the microservice (e.g., as part of isolated environment 112B).

Isolated environment 112A and isolated environment 112B can be referred to as "isolated environments" because they host respective different versions of the microservice in question, where the two versions of the microservice do not interact, and where requests can be routed to one of the two microservice versions, but not both.

In some examples, isolated environment provisioning in service mesh-based microservices systems component 108 can implement part(s) of the process flows of FIGS. 4-12 to implement isolated environment provisioning in service mesh-based microservices systems.

It can be appreciated that system architecture 100 is one example system architecture for isolated environment provisioning in service mesh-based microservices systems, and that there can be other system architectures that facilitate isolated environment provisioning in service mesh-based microservices systems.

Figure 2:
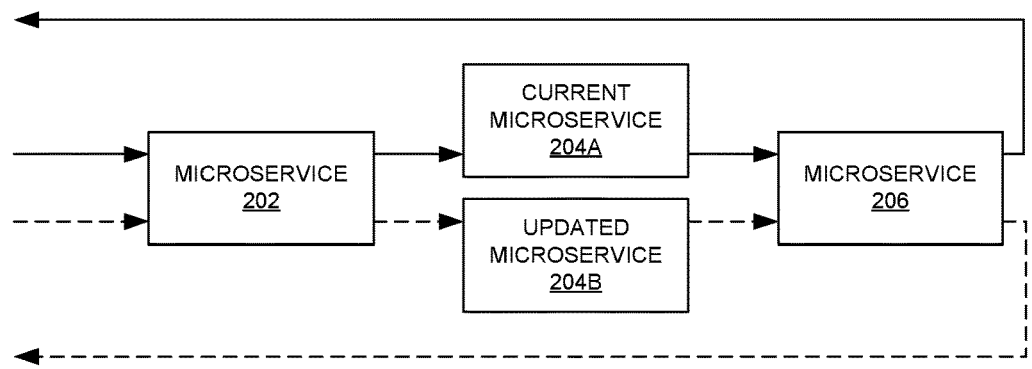
FIG. 2 illustrates another example system architecture that can facilitate isolated environment provisioning in service mesh-based microservices systems, in accordance with an embodiment of this disclosure.

FIG. 2 illustrates another example system architecture 200 that can facilitate isolated environment provisioning in service mesh-based microservices systems, in accordance with an embodiment of this disclosure. In some examples, part(s) of system architecture 200 can be used to implement a microservices architecture that is hosted by server 102 of FIG. 1 in service mesh 110.

System architecture 200 comprises isolated environment provisioning in service mesh-based microservices systems component 208 (which can be similar to isolated environment provisioning in service mesh-based microservices systems component 108 of FIG. 1), microservice 202, current microservice 204A, updated microservice 204B, and microservice 206.

Each of microservice 202, current microservice 204A, updated microservice 204B, and microservice 206 can comprise a computer service that is configured to interact with other microservice(s) via a service mesh to provide a service. A service mesh can generally comprise a dedicated infrastructure layer that facilitates transparently adding capabilities like observability, traffic management, and security without adding them to the code of microservices that run in the service mesh.

Updated microservice 204B can represent an updated version of current microservice 204A, and both can be in operation concurrently. One isolated environment (e.g., isolated environment 112A of FIG. 1) can then comprise microservice 202, current microservice 204A, and microservice 206 (with a data flow indicated by the solid line between these components). Another isolated environment (e.g., isolated environment 112B of FIG. 1) can then comprise microservice 202, updated microservice 204B, and microservice 206 (with a data flow indicated by the dashed line between these components). These two isolated environments can be in effect concurrently.

Figure 3:
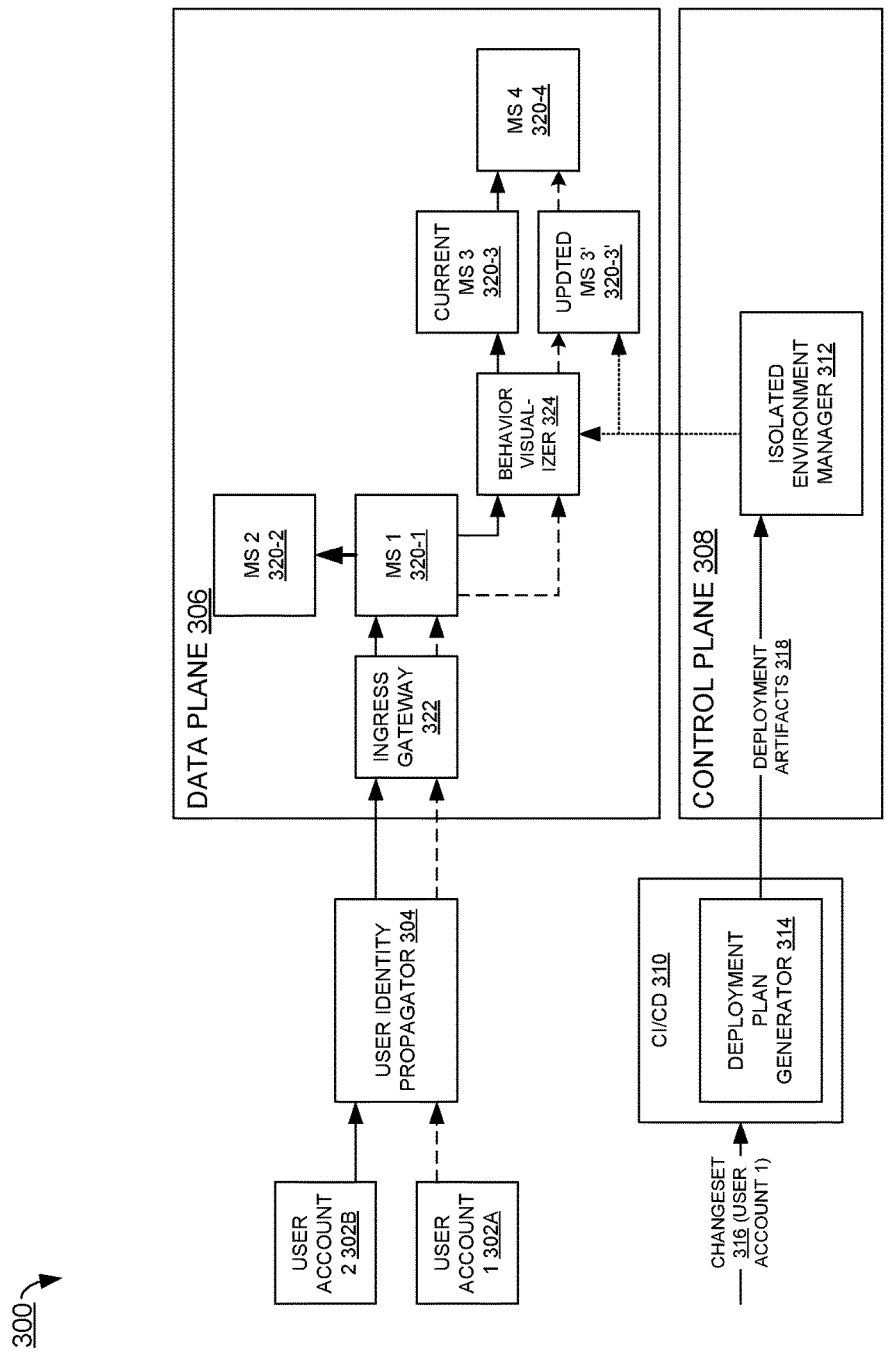
FIG. 3 illustrates another example system architecture that can facilitate isolated environment provisioning in service mesh-based microservices systems, in accordance with an embodiment of this disclosure.

FIG. 3 illustrates another example system architecture 300 that can facilitate isolated environment provisioning in service mesh-based microservices systems, in accordance with an embodiment of this disclosure. In some examples, part(s) of system architecture 300 can be used to implement part(s) of system architecture 100 of FIG. 1.

System architecture 300 comprises user account 1 202A and user account 2 202B (which can comprise user account identities in a computing service or device), user identity propagator 304, data plane 306, control plane 308, CI/CD 310, isolated environment manager 312, deployment plan generator 314, changeset 316, deployment artifacts 318, microservice 1 320-1, microservice 2 320-2, current microservice 3 320-3, updated microservice 3' 320-3', microservice 4 320-4, ingress gateway 322, and behavior visualizer 324.

User identity propagator 304 can receive an indication of user account 1 302A and/or user account 2 302B and propagate that user identity through the service mesh of data plane 306 so that routing decisions among isolated environments can be made based on user identity. Data plane 306 and control plane 308 can be parts of a service mesh, where data plane 306 carries out policies for microservices in a service mesh (e.g., routing decisions) that are defined by control plane 308.

CI/CD 310 can comprise a continuous integration/continuous delivery service that is configured to integrate changes to the microservices of data plane 306 into data plane 306, and to facilitate deploying those changes to data plane 306. Isolated environment manager 312 can determine routing policies for data plane 306 so that multiple versions of a microservice can coexist in separate isolated environments.

Deployment plan generator 314 can be configured to create deployment artifacts (e.g., deployment artifacts 318) from a changeset (e.g., changeset 316), and these deployment artifacts can be used to set routing policies by isolated environment manager 312. Changeset 316 can comprise a changeset for current microservice 3 320-3 (to create updated microservice 3' 320-3) that is submitted by user account 1 302A.

Ingress gateway 322 can be configured to load balance incoming requests to a service mesh architecture of data plane 306. Behavior visualizer 324 can be configured to visualize behavior a service mesh architecture of data plane 306 after applying virtual service and destination rules that are generated based on deployment artifacts 318.

Microservice 1 320-1, microservice 2 320-2, current microservice 3 320-3, updated microservice 3' 320-3', and microservice 4 320-4 can each be microservices in a service mesh architecture of data plane 306. Updated microservice 3' 320-3' can comprise an updated version of current microservice 3 320-3, and there can be separate isolated environments for updated microservice 3' 320-3' and current microservice 3 320-3.

Put another way, changeset 316 and an identifier of user account 1 302A can be received by deployment plan generator 314, which can generate deployment artifacts 318. Isolated environment manager 312 can receive deployment artifacts 318 and apply them in order to create updated microservice 3' 320-3', as well as adjust routing rules so that traffic of user account 1 302A can be routed to updated microservice 3' 320-3'.

User account 1 302A and user account 2 302B can execute flows and their corresponding user names can be propagated by user identity propagator 304. So, user account 1 302A can be routed within its isolated environment that includes instances of microservice 1 320-1, microservice 2 320-2, updated microservice 3' 320-3', and microservice 4 320-4 through the chain microservice 1 320-1, updated microservice 3' 320-3', and microservice 4 320-4. Then user account 2 302B can be routed within its isolated environment that includes instances of microservice 1 320-1, microservice 2 320-2, updated microservice 3 320-3, and microservice 4 320-4 through the chain microservice 1 320-1, updated microservice 3 320-3, and microservice 4 320-4.

A high-level flow can be as follows. Deployment plan generator 314 can be installed in CI/CD 310. Deployment plan generator 314 can generate artifacts (e.g., deployment artifacts 318) needed by the service mesh and deployment orchestrator for creation of a changed microservice's instance (e.g., updated microservice 3' 320-3'), and for routing traffic for the user that made the change to the changed microservice's instance.

Isolated environment manager 312 can be installed in control plane 308 of the service mesh, and apply service mesh artifacts that are received from the deployment plan generator. Service mesh artifacts can comprise, e.g., a YAML or JSON file. Service mesh artifacts can reference a microservice image that an instance of a microservice is to be created from, as well as additional information such as what labels to put and how many instances to process.

User identity propagator 304 can be installed as a plugin within a web browser, and can pass a user name of a logged in user as a special header value so that routing rules created by the deployment plan generator can act upon the header value in order to route the traffic to the changed microservice instance (e.g., updated microservice 3' 320-3') only for a user who made the change.

That is, relative to a prior system architecture, changes can be introduced to a CI/CD process, a service mesh, and a running application to integrate between those three systems in order to achieve automatic provisioning of the isolated environment.

Generating a deployment plan can be performed as follows. Deployment plan generator 314 can be installed in CI/CD 310. A developer submitting the changes can pass a <username> (which can be later used to login to the application) to CI/CD 310 as an input. Deployment plan generator 314 can receive the <username> from CI/CD 310, and can generate service mesh artifacts (e.g., deployment artifacts 318; in some examples, these can be files in a human-readable format, such as Yet Another Markup Language (YAML) or JavaScript Object Notation (JSON) files) that can allow creating a new instance of the microservice, where the new instance is marked with a special label. The value of this label can be set to <username>.

In addition, deployment plan generator 314 can generate artifacts in deployment artifacts 318 that are used to adjust routing rules to allow only traffic with a special header that matches the label to reach the changed microservice instance.

Note that a service mesh can generally comprise a dedicated infrastructure layer that allows transparently adding capabilities, like observability, traffic management, and security without adding them to microservices code. With the present techniques, a service mesh's traffic management capability can be used in order to create an isolated environment for a target user.

The following example can illustrate the present techniques, as they relate to artifacts generation for creating an isolated environment for user test_user1. This can be an orchestration deployment artifact that is intended for use for any user in its application, so its label named "user" has a value of "any." The image name can be jsmith/orders:

```
kind: Deployment
metadata:
  name: orders
spec:
  replicas: 1
  selector:
    matchLabels:
      app: orders
  template:
    metadata:
      labels:
        app: orders
        user: any
    spec:
      containers:
        name: orders
        image: jsmith/orders
        ports:
        containerPort: 8080
```

The following can be an orchestration deployment artifact that is created specifically for test_user1, so its label named "user" has value "test_user1." The image of the microservice here is named jsmith/orders-v2—it contains a change that was submitted by a user who will validate the change using username "test_user1."

```
kind: Deployment
metadata:
  name: orders
spec:
  replicas: 1
  selector:
    matchLabels:
      app: orders
  template:
    metadata:
      labels:
        app: orders
        user: test_user1
    spec:
      containers:
        name: orders
        image: jsmith/orders-v2
        ports:
        containerPort: 8080
```

The following can be a service mesh destination rule artifact that facilitates dividing incoming traffic to subsets. Here, traffic can be divided using a "user" label that is presented in the orchestrator's deployment artifact listed above. So, here, a new subset named "test_user1" is added to an existing destination rule.

```
kind: DestinationRule
metadata:
    name: orders-destination-rule
spec:
    host: orders-svc
    subsets:
        name: test_user1
        labels:
            user: test_user1
        name: any
        labels:
            user: any
```

The following can be a service mesh's virtual service artifact. A part can be added that permits checking for a value of an end-user header, and if it is equal to test_user1, then the traffic can be routed to a subset named test_user1. This can mean that traffic will reach the microservice created off the image jsmith/orders-v2 that contains the change introduced by the user testing with test_user1.

```
kind: VirtualService
metadata:
    name: reviews
spec:
    hosts:
        reviews
    http:
        match:
            headers:
                end-user:
                    exact: test_users1
        route:
            destination:
                host: orders-svc
                subset: test_user1
        route:
            destination:
                host: orders-svc
                subset: any
```

Isolated environment management can be performed as follows. An isolated environment manager can be installed in a control plane of the service mesh and can apply the service mesh artifacts received from the deployment plan generator in order to provision the new microservice instance with the required label, and adjust routing rules accordingly.

Later, when a user finishes its tasks within the environment, the isolated environment manager can be used to revert back all changes that were applied to create the isolated environment.

So, in the case of the previous example, to revert back all the changes can mean removing the corresponding snippets from a virtual service, destination rule and redeploy those artifacts, then apply the removal of the corresponding orchestration deployment file. That is, the changes can be applied in a reverse order as a creation flow. For removing the isolated environment, it can be that all the configuration changes related to it are removed, and apply this so that service mesh adjusts accordingly. For example, where the virtual service has a specific configuration per test_user1—it can be removed and the service mesh can be informed that it is no longer relevant. That is, this can be removed from deployment artifacts:

```
http:
    match:
        headers:
            end-user:
                exact: test_users1
    route:
        destination:
            host: orders-svc
            subset: test_user1
```

Similarly, this can be removed from deployment artifacts for a destination rule:

```
subsets:
    name: test_user1
    labels:
        user: test_user1
```

A user identity can be propagated as follows. A user identity propagator can be installed as a plugin within a web browser, or in addition to an application itself. The user identity propagator can take a <username> that was used to login, and can set a dedicated header named end-user with a value equal to <username>.

An end-user header can be propagated between microservices that are participating in the call chain. For this purpose, a dedicated interceptor can be used that can catch an incoming request, fetch an end-user header, and put it on an outgoing request.

An alternative approach can be to take a dedicated library, and configure it to handle an end-user header.

It can be that each flow originating from a browser can include an end-user header with the <username> value above. The value of the header can be consumed by routing rules generated by the deployment plan generator in order to route the traffic of the logged in <username> to its own dedicated microservice instances that were created previously through the corresponding deployment.

It can be that some service meshes can deduce a user from tokens (e.g., JSON web tokens (JWT tokens), and use those for routing.

Example Process Flows

FIG. 4 illustrates an example process flow 400 that can facilitate isolated environment provisioning in service mesh-based microservices systems, in accordance with an embodiment of this disclosure. In some examples, one or more embodiments of process flow 400 can be implemented by isolated environment provisioning in service mesh-based microservices systems component 108 of FIG. 1, or computing environment 1300 of FIG. 13.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 500 of FIG. 4, process flow 600 of FIG. 6, process flow 700 of FIG. 7, process flow 800 of FIG. 8, process flow 900 of FIG. 9, process flow 1000 of FIG. 10, process flow 1100 of FIG. 11, and/or process flow 1200 of FIG. 12.

Process flow 400 begins with 402, and moves to operation 404.

Operation 404 depicts receiving, at an integration and deployment component, a changeset for an updated microservice and an identifier of a user account that is configured to access the updated microservice, wherein the updated microservice represents an updated version relative to a current version of a microservice, and wherein the current version of the microservice is deployed to a service mesh that comprises a group of microservices. Using the example of FIG. 3, this can comprise user account 302A uploading changeset 316, where changeset is associated with user account 302A. The updated microservice can be updated microservice 3' 320-3' (though not yet instantiated into the service mesh of data plane 306 at this point), with the current version of the microservice being updated microservice 3 320-3.

After operation 404, process flow 400 moves to operation 406.

Operation 406 depicts instantiating the updated microservice to the service mesh based on the changeset. Continuing with the example of FIG. 3, this can comprise instantiating updated microservice 3' 320-3' so that it runs in the service mesh of data plane 306.

After operation 406, process flow 400 moves to operation 408.

Operation 408 depicts updating routing rules for the service mesh to indicate that any traffic in the service mesh that is associated with the user account and that is directed to the current version of the microservice is to be routed to the updated microservice. Continuing with the example of FIG. 3, this can comprise routing rules that are defined by isolated environment manager 312 and that affect how data is routed within data plane 306.

After operation 408, process flow 400 moves to operation 410.

Operation 410 depicts, in response to receiving traffic determined to be associated with the user account and directed to the current version of the microservice, routing the traffic to the updated microservice instead of routing the traffic to the current version of the microservice. Continuing with the example of FIG. 3, where user account 1 302A generates traffic to access the microservices, it can be routed to microservice 1 320-1, then to updated microservice 3' 320-3', then to microservice 4 320-4. In contrast, where user account 2 302B generates traffic to access the microservices, it can be routed to microservice 1 320-1, then to updated microservice 3 320-3 (rather than updated microservice 3' 320-3'), then to microservice 4 320-4. In this manner, two isolated environments—one that includes current microservice 3 320-3 and another that includes updated microservice 3' 320-3'—can be formed in the service mesh of data plane 306.

After operation 410, process flow 400 moves to 412, where process flow 400 ends.

Figure 5:
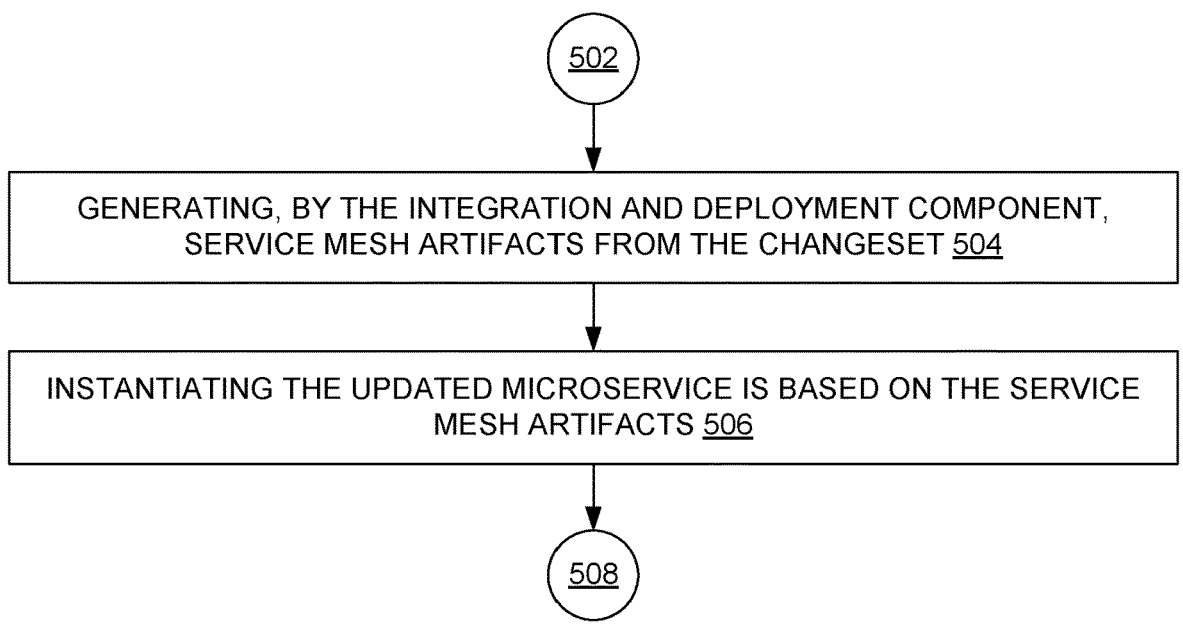
FIG. 5 illustrates another example process flow that can facilitate isolated environment provisioning in service mesh-based microservices systems, in accordance with an embodiment of this disclosure.

FIG. 5 illustrates an example process flow 500 that can facilitate isolated environment provisioning in service mesh-based microservices systems, in accordance with an embodiment of this disclosure. In some examples, one or more embodiments of process flow 500 can be implemented by isolated environment provisioning in service mesh-based microservices systems component 108 of FIG. 1, or computing environment 1300 of FIG. 13.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 400 of FIG. 4, process flow 600 of FIG. 6, process flow 700 of FIG. 7, process flow 800 of FIG. 8, process flow 900 of FIG. 9, process flow 1000 of FIG. 10, process flow 1100 of FIG. 11, and/or process flow 1200 of FIG. 12.

Process flow 500 begins with 502, and moves to operation 504.

Operation 504 depicts generating, by the integration and deployment component, service mesh artifacts from the changeset. Using the example of FIG. 3, the integration and deployment component can be CI/CD 310, the service mesh artifacts can be deployment artifacts 318, and the changeset can be changeset 316.

After operation 504, process flow 500 moves to operation 506.

Operation 506 depicts instantiating the updated microservice is based on the service mesh artifacts. Continuing with the example of FIG. 3, control plane 308 can instantiate updated microservice 3' 320-3' and update traffic routing rules so that traffic from user account 1 302A is routed to it rather than to current microservice 3 320-3.

In some examples, the updating of the routing rules for the service mesh is performed based on the service mesh artifacts.

In some examples, instantiating the updated microservice is performed by a control plane component of the service mesh, wherein the control plane component is separate from the integration and deployment component, and wherein the control plane component is configured to manage data planes of the service mesh. That is, an isolated environment manager (e.g., isolated environment manager 312 of FIG. 3) can be installed in a control plane (e.g., control plane 308) of a service mesh and can apply the service mesh artifacts (e.g., deployment artifacts 318) received from a deployment plan generator (e.g., deployment plan generator 314)

Put another way, a deployment plan generator can be installed in a CI/CD. It can generate the artifacts used by the service mesh and deployment orchestrator for creation of the changed microservice's instance and for routing traffic to it only per user that made the change.

After operation 506, process flow 500 moves to 508, where process flow 500 ends.

Figure 6:
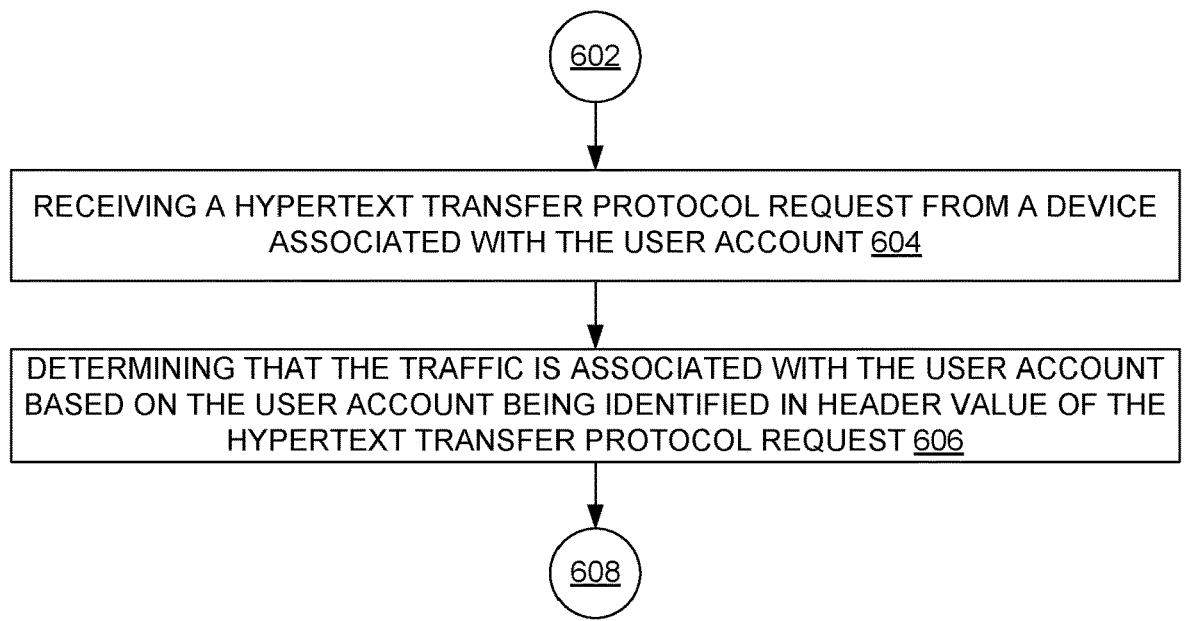
FIG. 6 illustrates another example process flow that can facilitate isolated environment provisioning in service mesh-based microservices systems, in accordance with an embodiment of this disclosure.

FIG. 6 illustrates an example process flow 600 that can facilitate isolated environment provisioning in service mesh-based microservices systems, in accordance with an embodiment of this disclosure. In some examples, one or more embodiments of process flow 600 can be implemented by isolated environment provisioning in service mesh-based microservices systems component 108 of FIG. 1, or computing environment 1300 of FIG. 13.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 400 of FIG. 4, process flow 500 of FIG. 5, process flow 700 of FIG. 7, process flow 800 of FIG. 8, process flow 900 of FIG. 9, process flow 1000 of FIG. 10, process flow 1100 of FIG. 11, and/or process flow 1200 of FIG. 12.

Process flow 600 begins with 602, and moves to operation 604.

Operation 604 depicts receiving a hypertext transfer protocol request from a device associated with the user account. Using the example of FIG. 1, server 102 can receive a hypertext transfer protocol request from client computer 106 via communications network 104.

In some examples, the traffic is received from a web browser, and a plugin of the web browser added the header value to the hypertext transfer protocol request. That is, client computer 106 can be configured with a web browser, and a plugin can be configured in the web browser, where the plugin adds the header value to hypertext transfer protocol requests that are originated in the web browser and destined for server 102.

In some examples, the plugin identified the user account based on the user account being logged into the device. That is, the plugin can be configured to determine a user account that is currently logged into client computer 106 at a time that the hypertext transfer protocol request is generated.

After operation 604, process flow 600 moves to operation 606.

Operation 606 depicts determining that the traffic is associated with the user account based on the user account being identified in header value of the hypertext transfer protocol request. That is, server 102 can receive the hypertext transfer protocol request and extract the identifier of the user account from the header value. This identifier of a user account can be used to route traffic within a service mesh—such as to route only traffic of user accounts that created an updated microservice to that updated microservice.

After operation 606, process flow 600 moves to 608, where process flow 600 ends.

Figure 7:
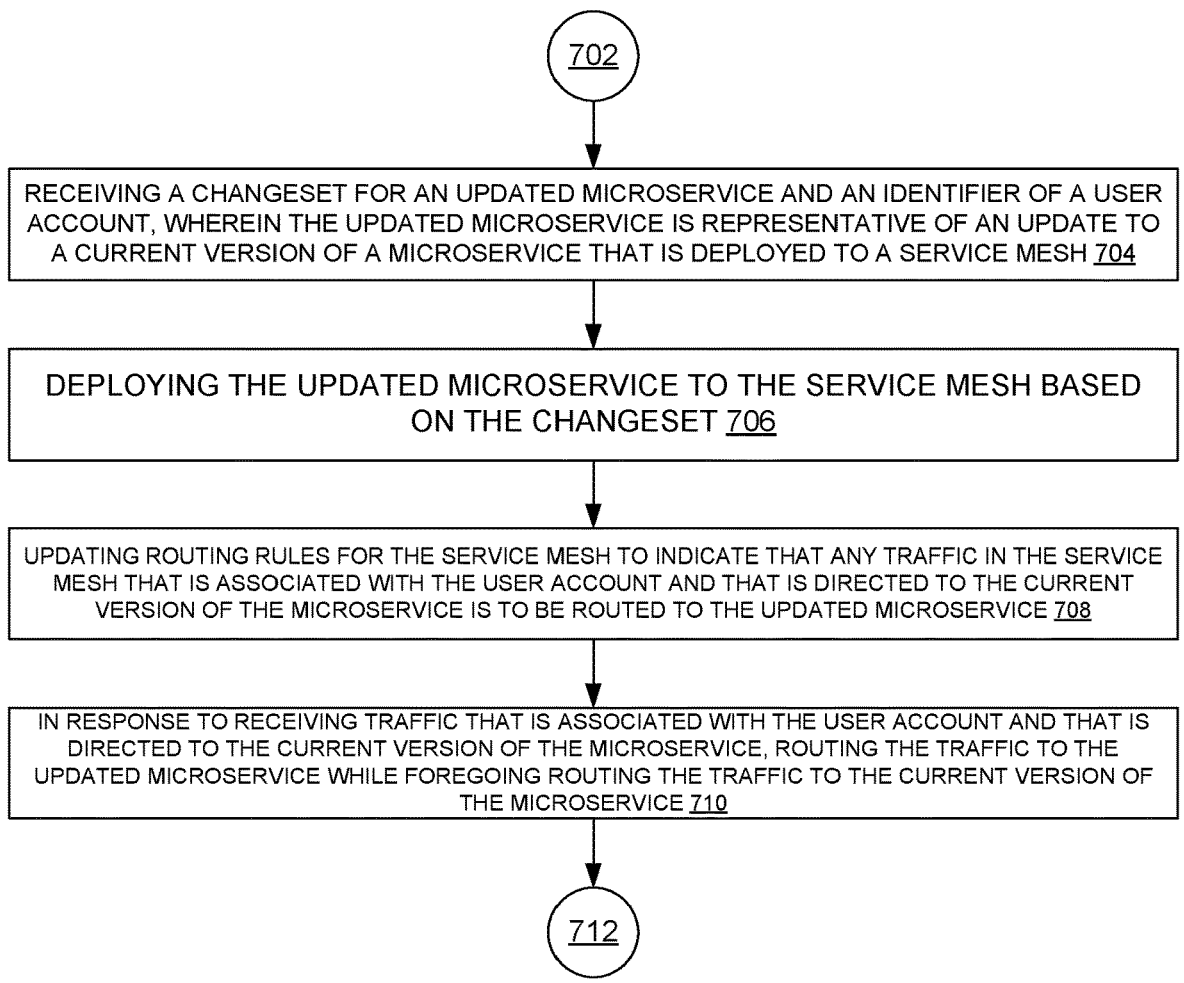
FIG. 7 illustrates another example process flow that can facilitate isolated environment provisioning in service mesh-based microservices systems, in accordance with an embodiment of this disclosure.

FIG. 7 illustrates an example process flow 700 that can facilitate isolated environment provisioning in service mesh-based microservices systems, in accordance with an embodiment of this disclosure. In some examples, one or more embodiments of process flow 700 can be implemented by isolated environment provisioning in service mesh-based microservices systems component 108 of FIG. 1, or computing environment 1300 of FIG. 13.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 400 of FIG. 4, process flow 500 of FIG. 5, process flow 600 of FIG. 6, process flow 800 of FIG. 8, process flow 900 of FIG. 9, process flow 1000 of FIG. 10, process flow 1100 of FIG. 11, and/or process flow 1200 of FIG. 12.

Process flow 700 begins with 702, and moves to operation 704.

Operation 704 depicts receiving a changeset for an updated microservice and an identifier of a user account, wherein the updated microservice is representative of an update to a current version of a microservice that is deployed to a service mesh. In some examples, operation 704 can be implemented in a similar manner as operation 404 of FIG. 4.

In some examples, the changeset is received at an integration and deployment component of the system. Using the example of FIG. 3, this integration and deployment component can be CI/CD 310.

In some examples, operation 704 comprises storing the identifier of the user account in a token that is passed between microservices of a call chain that corresponds to the traffic. That is, some service meshes can deduce the user from tokens (e.g., JSON Web Tokens—JWTs) and use the tokens for routing.

After operation 704, process flow 700 moves to operation 706.

Operation 706 depicts deploying the updated microservice to the service mesh based on the changeset. In some examples, operation 706 can be implemented in a similar manner as operation 406 of FIG. 4.

After operation 706, process flow 700 moves to operation 708.

Operation 708 depicts updating routing rules for the service mesh to indicate that any traffic in the service mesh that is associated with the user account and that is directed to the current version of the microservice is to be routed to the updated microservice. In some examples, operation 708 can be implemented in a similar manner as operation 408 of FIG. 4.

After operation 708, process flow 700 moves to operation 710.

Operation 710 depicts, in response to receiving traffic that is associated with the user account and that is directed to the current version of the microservice, routing the traffic to the updated microservice while foregoing routing the traffic to the current version of the microservice. In some examples, operation 710 can be implemented in a similar manner as operation 410 of FIG. 4.

In some examples, the routing of the traffic comprises propagating the identifier of the user account to microservices via a call chain that corresponds to the traffic. That is, an end-user header can be propagated between microservices that participate in a particular call chain.

After operation 710, process flow 700 moves to 712, where process flow 700 ends.

Figure 8:
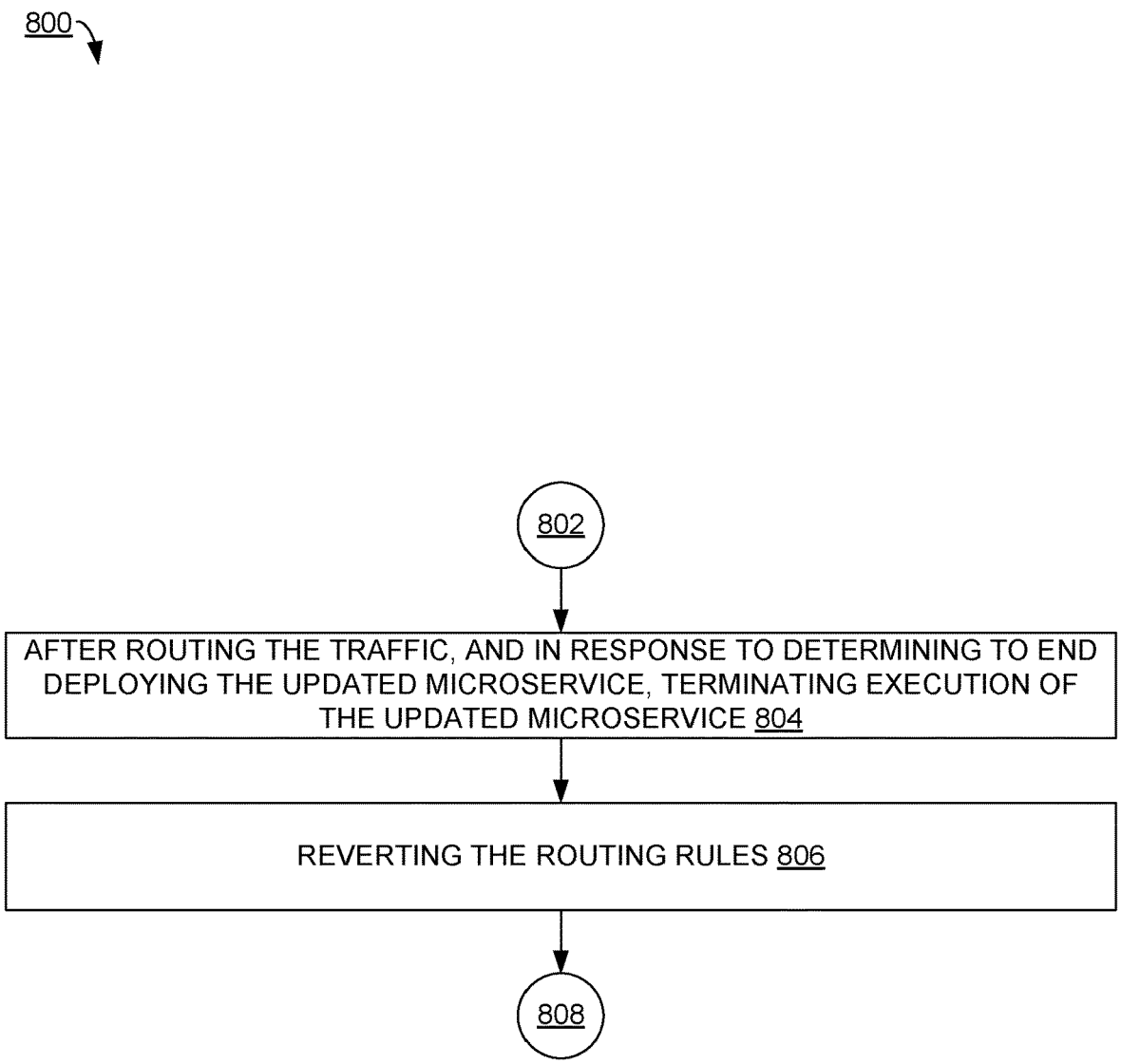
FIG. 8 illustrates another example process flow that can facilitate isolated environment provisioning in service mesh-based microservices systems, in accordance with an embodiment of this disclosure.

FIG. 8 illustrates an example process flow 800 that can facilitate isolated environment provisioning in service mesh-based microservices systems, in accordance with an embodiment of this disclosure. In some examples, one or more embodiments of process flow 800 can be implemented by isolated environment provisioning in service mesh-based microservices systems component 108 of FIG. 1, or computing environment 1300 of FIG. 13.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 400 of FIG. 4, process flow 500 of FIG. 5, process flow 600 of FIG. 6, process flow 700 of FIG. 7, process flow 900 of FIG. 9, process flow 1000 of FIG. 10, process flow 1100 of FIG. 11, and/or process flow 1200 of FIG. 12.

Process flow 800 begins with 802, and moves to operation 804.

Operation 804 depicts, after routing the traffic, and in response to determining to end deploying the updated microservice, terminating execution of the updated microservice. That is, when a user account that created a changeset from which an updated microservice was generated, that user account can finish its tasks within the isolated environment of the updated microservice, and an isolated environment manager (e.g., isolated environment manager 312 of FIG. 3) can revert back changes that were applied to create the isolated environment. In operation 804, this reverting back of changes can comprise terminating execution of the updated microservice.

After operation 804, process flow 800 moves to operation 806.

Operation 806 depicts reverting the routing rules. In some examples, updating the routing rules transforms first routing rules to second routing rules, and operation 806 comprises reverting the second routing rules to the first routing rules.

That is, where isolated environment manager 312 of FIG. 3 created updated routing rules as part of creating an isolated environment for an updated microservice, as part of reverting back the changes when use of the updated microservice instance is done (at least for the time being), the updated routing rules can be reverted back to a previous version of routing rules (e.g., that all traffic goes to current microservice 3 320-3 and none goes to updated microservice 3 320-3', which could now be terminated).

In some examples, the terminating (of operation 804) and the reverting (of operation 806) are performed by a control plane component of the system. Using the example of FIG. 3, the control plane component can be control plane 308 (including being isolated environment manager 312).

After operation 806, process flow 800 moves to 808, where process flow 800 ends.

Figure 9:
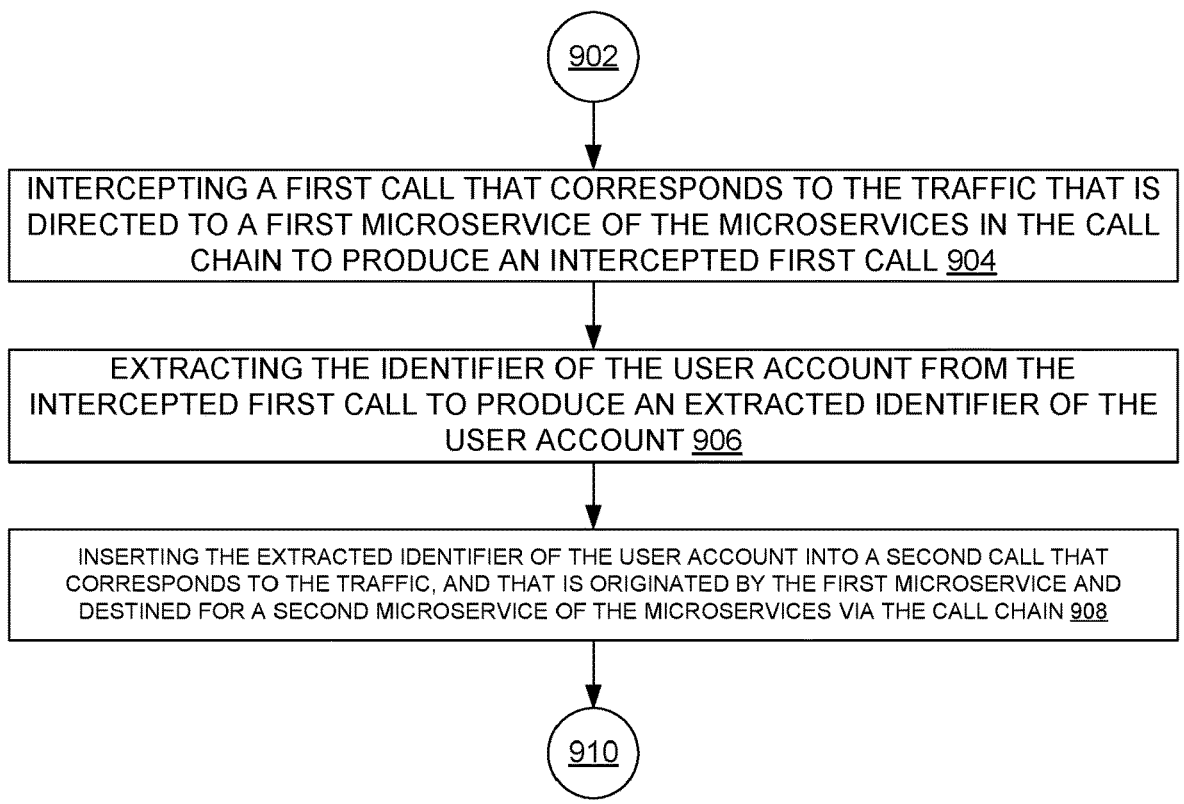
FIG. 9 illustrates another example process flow that can facilitate isolated environment provisioning in service mesh-based microservices systems, in accordance with an embodiment of this disclosure.

FIG. 9 illustrates an example process flow 900 that can facilitate isolated environment provisioning in service mesh-based microservices systems, in accordance with an embodiment of this disclosure. In some examples, one or more embodiments of process flow 900 can be implemented by isolated environment provisioning in service mesh-based microservices systems component 108 of FIG. 1, or computing environment 1300 of FIG. 13.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, process flow 1000 of FIG. 10, process flow 1100 of FIG. 11, and/or process flow 1200 of FIG. 12.

Process flow 900 begins with 902, and moves to operation 904.

Operation 904 depicts intercepting a first call that corresponds to the traffic that is directed to a first microservice of the microservices in the call chain to produce an intercepted first call. Using the example of FIG. 1, an interceptor component of server 102 catch incoming requests to service mesh 110, fetch a user-header from the request, and then place it in an outgoing request. The interceptor component can do this for each call passed between microservices in service mesh 110.

After operation 904, process flow 900 moves to operation 906.

Operation 906 depicts extracting the identifier of the user account from the intercepted first call to produce an extracted identifier of the user account. This can comprise the interceptor component fetching a user-header from the intercepted first call.

After operation 906, process flow 900 moves to operation 908.

Operation 908 depicts inserting the extracted identifier of the user account into a second call that corresponds to the traffic, and that is originated by the first microservice and destined for a second microservice of the microservices via the call chain. This can comprise the interceptor component putting the user-header in an outgoing request.

After operation 908, process flow 900 moves to 910, where process flow 900 ends.

FIG. 10 illustrates an example process flow 1000 that can facilitate isolated environment provisioning in service mesh-based microservices systems, in accordance with an embodiment of this disclosure. In some examples, one or more embodiments of process flow 1000 can be implemented by isolated environment provisioning in service mesh-based microservices systems component 108 of FIG. 1, or computing environment 1300 of FIG. 13.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, process flow 900 of FIG. 9, process flow 1100 of FIG. 11, and/or process flow 1200 of FIG. 12.

Process flow 1000 begins with 1002, and moves to operation 1004.

Operation 1004 depicts saving the identifier of the user account to a library. The library can be a component of server 102 of FIG. 1 that is configured to handle end-user headers.

After operation 1004, process flow 1000 moves to operation 1006.

Operation 1006 depicts the library adding the identifier of the user account to calls represented in a call chain that corresponds to the traffic. In some examples, the library of operation 1004 can extract an end-user header from received requests and insert it into calls in a corresponding call chain of microservices within service mesh 110.

After operation 1006, process flow 1000 moves to 1008, where process flow 1000 ends.

FIG. 11 illustrates an example process flow 1100 that can facilitate isolated environment provisioning in service mesh-based microservices systems, in accordance with an embodiment of this disclosure. In some examples, one or more embodiments of process flow 1100 can be implemented by isolated environment provisioning in service mesh-based microservices systems component 108 of FIG. 1, or computing environment 1300 of FIG. 13.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, and/or process flow 1200 of FIG. 12.

Process flow 1100 begins with 1102, and moves to operation 1104.

Operation 1104 depicts, based on receiving an identifier of a user account and a changeset applicable to generate an updated microservice relative to a current version of a microservice that is deployed to a service mesh, deploying the updated microservice to the service mesh. In some examples, operation 1104 can be implemented in a similar manner as operations 404-406 of FIG. 4.

In some examples, deploying the updated microservice comprises marking the updated microservice with a label that stores the identifier of the user account. That is, in some examples a deployment plan generator (e.g., deployment plan generator 314 of FIG. 3) can generate service mesh artifacts (e.g., deployment artifacts 318) that facilitate creating a new instance of a microservice (e.g., updated microservice 3' 320-3') with a special label that is set to the identifier of the user account (e.g., user account 1 302A).

Using the above example of an orchestration deployment artifact that is created specifically for test_user1, so its label named "user" has value "test_user1," the special label can be set with:

labels:
   app: orders
   user: test_user1

In some examples, the service mesh comprises an infrastructure layer for a group of microservices that comprises the updated microservice and the current version of the microservice. That is, the service mesh (e.g., service mesh 110 of FIG. 1) can comprise a dedicated infrastructure layer that facilitates transparently adding capabilities like observability, traffic management, and security without adding them to the code of microservices that run in the service mesh.

After operation 1104, process flow 1100 moves to operation 1106.

Operation 1106 depicts updating routing rules for the service mesh to indicate that any portions of traffic in the service mesh that are associated with the user account and that are directed to the current version of the microservice is to be routed to the updated microservice. In some examples, operation 1106 can be implemented in a similar manner as operation 408 of FIG. 4.

After operation 1106, process flow 1100 moves to operation 1108.

Operation 1108 depicts, in response to receiving first traffic of the traffic, wherein the first traffic is determined to be associated with the user account and determined to be directed to the current version of the microservice, routing the first traffic to the updated microservice instead of routing the first traffic to the current version of the microservice. In some examples, operation 1108 can be implemented in a similar manner as operation 410 of FIG. 4.

In some examples, the updated microservice is part of a first isolated environment of the service mesh, the current version of the microservice is part of a second isolated environment of the service mesh, the first isolated environment is configured to receive the first traffic and is configured to exclude second traffic of the traffic, and the second isolated environment is configured to receive the second traffic and is configured to exclude the first traffic. That is, the updated microservice can be part of isolated environment 112A of FIG. 1, while the current version of the microservice can be part of isolated environment 112B of FIG. 1. Turning to the example of FIG. 3, it can be that current microservice 3 320-3 executes within isolated environment 112A while updated microservice 3' 320-3' executes within isolated environment 112B.

After operation 1108, process flow 1100 moves to 1110, where process flow 1100 ends.

Figure 12:
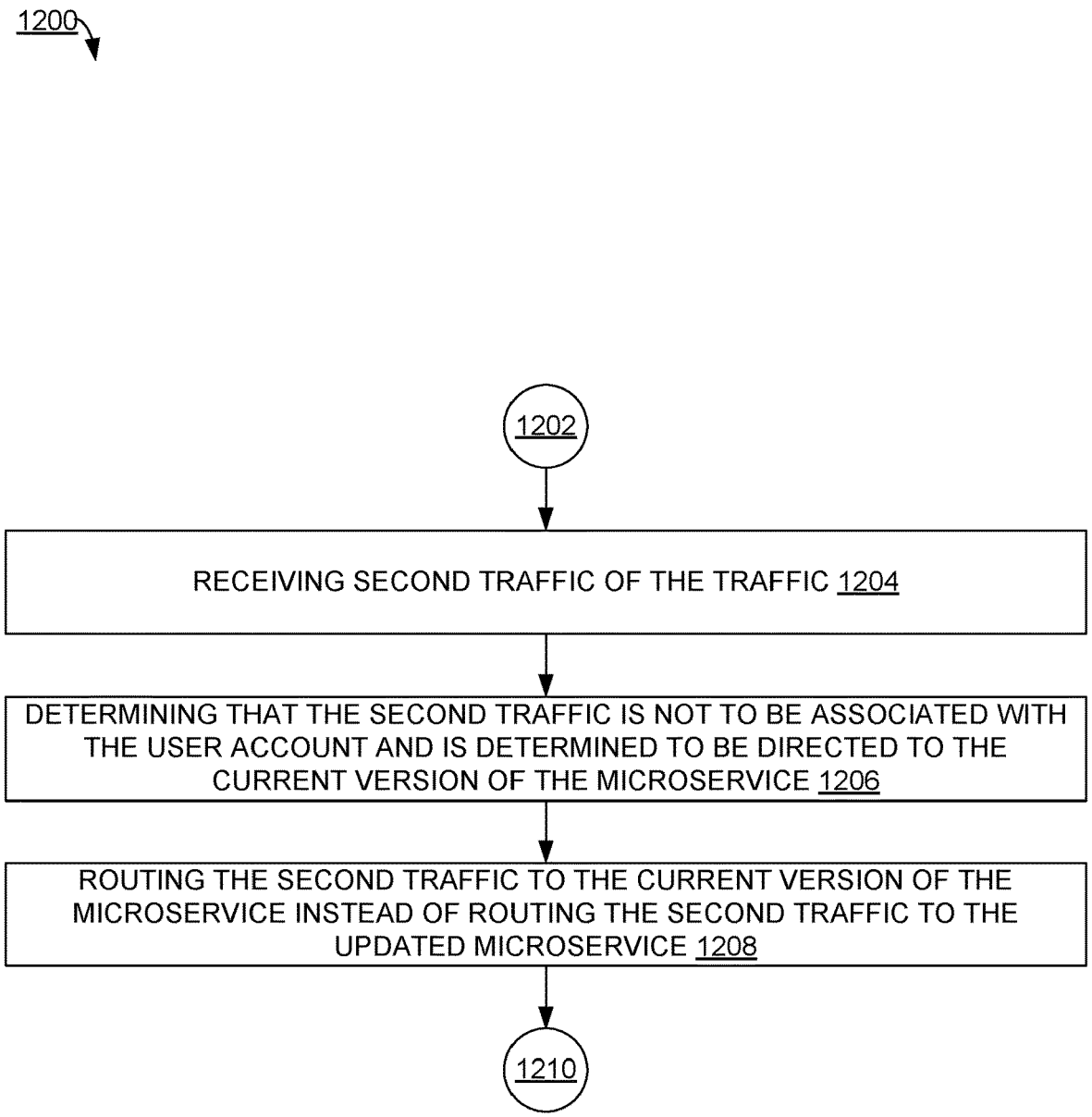
FIG. 12 illustrates another example process flow that can facilitate isolated environment provisioning in service mesh-based microservices systems, in accordance with an embodiment of this disclosure.

FIG. 12 illustrates an example process flow 1200 that can facilitate isolated environment provisioning in service mesh-based microservices systems, in accordance with an embodiment of this disclosure. In some examples, one or more embodiments of process flow 1200 can be implemented by isolated environment provisioning in service mesh-based microservices systems component 108 of FIG. 1, or computing environment 1300 of FIG. 13.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, and/or process flow 1100 of FIG. 11.

Process flow 1200 begins with 1202, and moves to operation 1204.

Operation 1204 depicts receiving second traffic of the traffic. This can be second traffic relative the first traffic of operation 1108 of FIG. 11. This traffic can be received by server 102 of FIG. 1.

After operation 1204, process flow 1200 moves to operation 1206.

Operation 1206 depicts determining that the second traffic is not to be associated with the user account and is determined to be directed to the current version of the microservice. For example, where traffic associated with the user account is tagged with an identifier of the user account in a header, this can comprise determining that the header identifies a different user account or that there is no such header in the traffic.

After operation 1206, process flow 1200 moves to operation 1208.

Operation 1208 depicts routing the second traffic to the current version of the microservice instead of routing the second traffic to the updated microservice. Using the example of FIG. 3, this can comprise routing the second traffic to current microservice 3 320-3 as opposed to updated microservice 3' 320-3' (where the traffic is associated with user account 1 302A).

After operation 1208, process flow 1200 moves to 1210, where process flow 1200 ends.

Example Operating Environment

In order to provide additional context for various embodiments described herein, FIG. 13 and the following discussion are intended to provide a brief, general description of a suitable computing environment 1300 in which the various embodiments of the embodiment described herein can be implemented.

For example, parts of computing environment 1300 can be used to implement one or more embodiments of server 102 and/or client computer 106 of FIG. 1.

In some examples, computing environment 1300 can implement one or more embodiments of the process flows of FIGS. 4-12 to facilitate isolated environment provisioning in service mesh-based microservices systems.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a nonvolatile storage such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are examples and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    at least one processor; and
    at least one memory coupled to the processor, comprising instructions that, in response to execution by the at least one processor, cause the system to perform operations, comprising:
        receiving, at an integration and deployment component, a changeset for an updated microservice and an identifier of a user account that is configured to access the updated microservice, wherein the updated microservice represents an updated version relative to a current version of a microservice, and wherein the current version of the microservice is deployed to a service mesh that comprises a group of microservices;
        instantiating the updated microservice to the service mesh based on the changeset;
        updating routing rules for the service mesh to indicate that any traffic in the service mesh that is associated with the user account and that is directed to the current version of the microservice is to be routed to the updated microservice; and in response to receiving traffic determined to be associated with the user account and directed to the current version of the microservice, routing the traffic to the updated microservice instead of routing the traffic to the current version of the microservice, wherein the traffic is routed through a group of microservices that comprises the updated microservice, the traffic being routed comprising, intercepting a first call that corresponds to the traffic that is directed to a first microservice of the group of microservices in a call chain to produce an intercepted first call;

extracting the identifier of the user account from the intercepted first call to produce an extracted identifier of the user account;

storing the identifier of the user account in a token that is passed between microservices of the call chain that corresponds to the traffic; and inserting the extracted identifier of the user account into a second call that corresponds to the traffic, and that is originated by the first microservice and destined for a second microservice of the group of microservices in the call chain.

2. The system of claim 1, wherein the operations further comprise:

generating, by the integration and deployment component, service mesh artifacts from the changeset, wherein instantiating the updated microservice is performed based on the service mesh artifacts.

3. The system of claim 2, wherein the updating of the routing rules for the service mesh is performed based on the service mesh artifacts.

4. The system of claim 3, wherein instantiating the updated microservice is performed by a control plane component of the service mesh, wherein the control plane component is separate from the integration and deployment component, and wherein the control plane component is configured to manage data planes of the service mesh.

5. The system of claim 1, wherein the operations further comprise:

determining that the traffic is associated with the user account based on the user account being identified in a header value of a hypertext transfer protocol request received from a device associated with the user account.

6. The system of claim 5, wherein the traffic is received from a web browser, and wherein a plugin of the web browser added the header value to the hypertext transfer protocol request.

7. The system of claim 6, wherein the plugin identified the user account based on the user account being logged into the device.

8. A method, comprising:

receiving, by a system comprising at least one processor, a changeset for an updated microservice and an identifier of a user account, wherein the updated microservice is representative of an update to a current version of a microservice that is deployed to a service mesh;

deploying, by the system, the updated microservice to the service mesh based on the changeset;

updating, by the system, routing rules for the service mesh to indicate that any traffic in the service mesh that is associated with the user account and that is directed to the current version of the microservice is to be routed to the updated microservice; and in response to receiving traffic that is associated with the user account and that is directed to the current version of the microservice, routing, by the system, the traffic to the updated microservice while foregoing routing the traffic to the current version of the microservice, wherein the traffic is routed through microservices that comprises the updated microservice, the traffic being routed comprising, extracting, by the system, the identifier of the user account from a first call that corresponds to the traffic that is directed to a first microservice of the microservices in a call chain to produce an extracted identifier of the user account;

storing, by the system, the identifier of the user account in a token that is passed between microservices of the call chain that corresponds to the traffic; and inserting, by the system, the extracted identifier of the user account into a second call that corresponds to the traffic, and that is originated by the first microservice and destined for a second microservice of the microservices in the call chain.

9. The method of claim 8, wherein the changeset is received at an integration and deployment component of the system.

10. The method of claim 8, wherein updating the routing rules transforms first routing rules to second routing rules, and further comprising:

after routing the traffic, and in response to determining to end deploying the updated microservice, terminating, by the system, execution of the updated microservice, and reverting, by the system, the second routing rules to the first routing rules.

11. The method of claim 10, wherein the terminating and the reverting are performed by a control plane component of the system.

12. The method of claim 8, further comprising:

saving, by the system, the identifier of the user account to a library, wherein the library is configured to add the identifier of the user account to calls represented in the call chain that corresponds to the traffic.

13. A non-transitory computer-readable medium comprising instructions that, in response to execution, cause a system comprising at least one processor to perform operations, comprising:

based on receiving an identifier of a user account and a changeset applicable to generate an updated microservice relative to a current version of a microservice that is deployed to a service mesh, deploying the updated microservice to the service mesh;

updating routing rules for the service mesh to indicate that any portions of traffic in the service mesh that are associated with the user account and that are directed to the current version of the microservice is to be routed to the updated microservice;

in response to receiving first traffic of the traffic, wherein the first traffic is determined to be associated with the user account and determined to be directed to the current version of the microservice, routing the first traffic to the updated microservice instead of routing the first traffic to the current version of the microservice, wherein the first traffic is routed through microservices that comprises the updated microservice, the first traffic being routed comprising, extracting the identifier of the user account from a first call that corresponds to the traffic that is directed to a first microservice of the microservices in a call chain to produce an extracted identifier of the user account;

storing, by the system, the identifier of the user account in a token that is passed between microservices of the call chain that corresponds to the traffic; and inserting the extracted identifier of the user account into a second call that corresponds to the first traffic, and that is originated by the first microservice and destined for a second microservice of the microservices in the call chain.

14. The non-transitory computer-readable medium of claim 13, wherein the operations further comprise:

in response to receiving second traffic of the traffic, wherein the second traffic is determined not to be associated with the user account and is determined to be directed to the current version of the microservice, routing the second traffic to the current version of the microservice instead of routing the second traffic to the updated microservice.

15. The non-transitory computer-readable medium of claim 13, wherein deploying the updated microservice comprises:

marking the updated microservice with a label that stores the identifier of the user account.

16. The non-transitory computer-readable medium of claim 13, wherein the service mesh comprises an infrastructure layer for a group of microservices that comprises the updated microservice and the current version of the microservice.

17. The non-transitory computer-readable medium of claim 13, wherein the updated microservice is part of a first isolated environment of the service mesh, wherein the current version of the microservice is part of a second isolated environment of the service mesh, wherein the first isolated environment is configured to receive the first traffic and is configured to exclude second traffic of the traffic, and wherein the second isolated environment is configured to receive the second traffic and is configured to exclude the first traffic.

18. The system of claim 1, wherein the operations further comprise:

saving the identifier of the user account to a library, wherein the library is configured to add the identifier of the user account to calls represented in the call chain.

19. The non-transitory computer-readable medium of claim 13, wherein the operations further comprise:

saving the identifier of the user account to a library, wherein the library is configured to add the identifier of the user account to calls represented in the call chain.

20. The non-transitory computer-readable medium of claim 13, wherein the operations further comprise:

generating service mesh artifacts from the changeset, wherein deploying the updated microservice is performed based on the service mesh artifacts.

* * * * *